US006861817B2

(12) United States Patent
Pigott et al.

(10) Patent No.: US 6,861,817 B2
(45) Date of Patent: Mar. 1, 2005

(54) METHOD AND APPARATUS FOR DETECTING A STALL CONDITION IN A STEPPING MOTOR

(75) Inventors: John M. Pigott, Phoenix, AZ (US); Thomas Jeffrey Reiter, Dearborn, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 70 days.

(21) Appl. No.: 10/027,514

(22) Filed: Dec. 21, 2001

(65) Prior Publication Data

US 2003/0117100 A1 Jun. 26, 2003

(51) Int. Cl.$^7$ .............................................. G05B 19/40
(52) U.S. Cl. ...................... 318/685; 318/696; 318/671; 318/560
(58) Field of Search ................................ 318/560, 671, 318/685, 696, 254

(56) References Cited

U.S. PATENT DOCUMENTS

| 4,119,895 A | * | 10/1978 | Muller ........................ 318/254 |
| 4,250,435 A | * | 2/1981 | Alley et al. ................. 318/138 |
| 4,491,424 A | * | 1/1985 | Ito et al. ..................... 368/157 |
| 4,851,755 A | * | 7/1989 | Fincher ....................... 318/696 |
| 4,928,043 A | * | 5/1990 | Plunkett ...................... 318/254 |
| 5,017,846 A | * | 5/1991 | Young et al. ................. 318/244 |
| 5,023,527 A | * | 6/1991 | Erdman et al. .............. 318/254 |
| 5,032,781 A | | 7/1991 | Kronenberg |
| 5,287,050 A | | 2/1994 | Kronenberg |
| 5,646,491 A | * | 7/1997 | Erdman et al. .............. 318/254 |
| 5,739,652 A | * | 4/1998 | Sriram ......................... 318/439 |
| 5,744,921 A | * | 4/1998 | Makaran ..................... 318/254 |
| 5,949,203 A | * | 9/1999 | Buthker ....................... 318/254 |
| 6,014,000 A | * | 1/2000 | Gutierrez ..................... 318/696 |
| 6,236,183 B1 | * | 5/2001 | Schroeder .................... 318/721 |
| 6,476,580 B1 | * | 11/2002 | Nakamiya et al. .......... 318/696 |
| 6,586,898 B2 | * | 7/2003 | King et al. .................. 318/254 |

FOREIGN PATENT DOCUMENTS

| DE | 4035970 A1 | 6/1991 |
| EP | 0305876 A2 | 3/1989 |
| FR | 2750544 A1 | 1/1998 |

OTHER PUBLICATIONS

PCT International Search Report.

* cited by examiner

*Primary Examiner*—David Martin
*Assistant Examiner*—Renata McCloud

(57) ABSTRACT

Stepped rotary motion is imparted to the rotor of a stepping motor by alternately driving at least first and second coils which interact with a plurality of magnetic poles on the rotor. When each of the coils transitions from a driven to a non-driven state, the continued motion of the rotor causes a back electro-motive force to be generated in the coil. The electro-motive forces produced by the coils are rectified, integrated, and then compared with a threshold to determine if a motor stall condition exists.

6 Claims, 3 Drawing Sheets

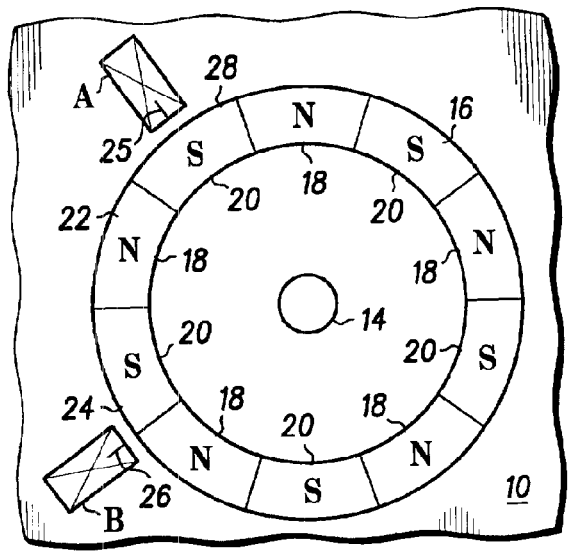
FIG. 1
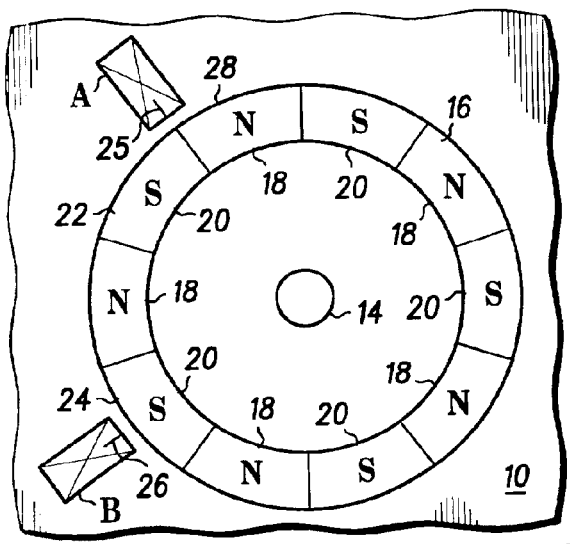
FIG. 2
FIG. 3

METHOD AND APPARATUS FOR DETECTING A STALL CONDITION IN A STEPPING MOTOR

FIELD OF THE INVENTION

This invention relates generally to motor control systems, and more particularly to a method and apparatus for detecting a stall condition in a stepping motor. Still more particularly, this invention relates to a method and apparatus for detecting and measuring changes in flux of a deenergized winding in a stepping motor to determine if the motor's rotor has stepped (rotated).

BACKGROUND OF THE INVENTION

Stepping motors are compact, direct drive motors which are capable of providing high torque with a high degree of accuracy. That is, such motors are characterized by gear ratios in the neighborhood of 200:1 and can be incrementally stepped utilizing digital circuitry. For these and other reasons, stepping motors have been found to be especially suitable for use in automotive dashboard actuators such as speedometers, tachometers, and the like.

A two phase stepping motor may described as comprising at least first and second coils (i.e. coil A and coil B) perpendicularly oriented with respect to each other which are alternately driven with currents of opposite polarities. For example, coil A is driven by a current of a first polarity, followed by coil B being driven by a current of the same polarity. Next coil A is driven by a current with a second opposite polarity followed by driving coil B with a current of the same opposite polarity, and so on. A magnetic ring attached to the motor's rotor is configured to have a plurality of pairs of poles (e.g. five pairs of north and south poles) that are individually and selectively attracted by the magnetic fields created by driving coils A and B as described above. In the case of a speedometer or tachometer, the driving current is related to the physical speed of the vehicle (e.g. miles per hour (mph)) or the revolutions-per-minute (rpm) of the engine, as the case may be, which may, in turn, be reflected on a gauge by a needle or pointer attached to the rotor of the stepping motor.

Unfortunately, a difficulty is encountered when stepping motors are unitized in open-loop applications of the type described above. Due to the lack of feedback, there is no way to determine if a motor has driven the needle or pointer to the correct position and no way to correct the reading if a step or steps have been lost. Furthermore, when power is removed from the stepping motor, the pointer remains in the position it occupied at the time power was turned off thus destroying the relationship between the variable being measured and displayed (e.g. mph, rpm) and the actual position of the pointer. Thus, it has been found necessary to initialize or synchronize the stepping motor with the position of the needle being driven thereby each time power is applied to the system as, for example, when the ignition is first turned on or when the system is recovering from a failure such as an over-voltage condition, an inadvertent power interruption, or the like. This establishes a predetermined and desired relationship between the stepping motor/needle assembly and the physical parameters being displayed.

One technique for accomplishing the above described initialization or calibration involves the detection of the motor's stall condition; i.e. the condition of the stepping motor when the needle attached to its rotor is accurately positioned at the zero-point of the gauge (e.g. zero mph, zero rpm, etc.) or any other desired known position. In the past, one approach involved driving the motor's needle assembly counter-clockwise for an amount of time sufficient to move the needle from the farthest clockwise position capable of being reached by the needle to a point at which it strikes an obstacle such as a mechanical stop or peg located at a position on the gauge or within the stepping motor corresponding to zero. This might take as long as two seconds and could result in slamming the needle into the mechanical stop or peg causing it to bounce possibly distracting the driver.

It was latter recognized that a stepping motor's stall condition can be detected by monitoring the electro-motive-force (emf) developed in the stepping motor's coils (A and B) resulting from changes in flux therein due to the rotor's motion. That is, when the motor is stopped (as for example when it strikes the mechanical stop or peg) its rotor can no longer step or turn, and no emf voltage is generated. Thus, a technique was developed wherein the voltage created by the above described back emf is monitored by comparing it with a threshold voltage. If the threshold voltage is not exceeded, the stepping motor is assumed to be in its stalled position. For a further discussion of this approach, the interested reader is directed to U.S. Pat. No. 5,032,781 issued on Jul. 16, 1991 to Kronenberg and entitled "METHOD AND CIRCUIT FOR OPERATING A STEPPING MOTOR" and U.S. Pat. No. 5,287,050 issued on Feb. 15, 1994 to Kronenberg et al. and entitled "METHOD OF SYNCRONIZATION FOR AN INDICATION INSTRUMENT WITH ELECTROMAGNETICALLY CONTROLLED STEPPING MOTOR."

While the above described approach is generally acceptable when a stepping motor is operating in a high-speed mode, it presents certain difficulties for low-speed applications. In a high-speed mode, the rotor is continually turning, and the magnetic flux in the non-driven coil or phase will change fairly smoothly. This results in the generation of a relatively smooth back emf voltage level. Due to the high speed, the lag between the rotor and the drive signal is slight; i.e. the rotor doesn't quite reach the magnetized pole before the drive signal changes. The magnetic flux will increase for a very short time after the pole is deenergized and then will decrease to substantially zero. This decrease results in the generation of a relatively steady voltage, the magnitude of which depends on the supply voltage and motor velocity; typically in the nature of a few hundred millivolts. Thus, a high-speed zero-point detection or reset merely involves determining if this voltage exceeds the predetermined threshold. However, in a low-speed mode, the back emf is not unidirectional but oscillates. Furthermore, the characteristics of the back emf can vary with the inertia of the rotor and the size of the load (e.g. mass of the needle) being driven by the motor. A heavy load could result in slower rotor movement and lower back emf voltages. Thus, merely comparing this voltage to a predetermined threshold could result in inaccurate zero-point or reset detection and calibration.

In view of the forgoing, it should be appreciated that it would desirable to provide a method and apparatus for detecting a stall condition in a stepping motor which is dependent only on motor design and is independent of the load being driven by the motor.

BRIEF DESCRIPTION OF THE DRAWINGS

The following drawings are illustrations of particular embodiments of the invention and therefore do not limit the scope of the invention, but are presented to assist in providing a proper understanding of the invention. The drawings are not to scale (unless so stated) and are intended for use in conjunction with the explanations in the following detailed description. The present invention will hereinafter be described in conjunction with the accompanying drawings, wherein like referenced numerals denote like elements, and;

FIGS. 1, 2 and FIG. 3 are exposed plan views illustrating the basic elements of a stepping motor and their relative positions at three stages of operation;

FIG. 6 is a functional block diagram illustrating the use of a stepping motor for displaying a variable such as vehicle speed, engine rpm, or the like;

DESCRIPTION OF THE PREFFERED EXEMPLARY EMBODIMENTS

Figure 4:
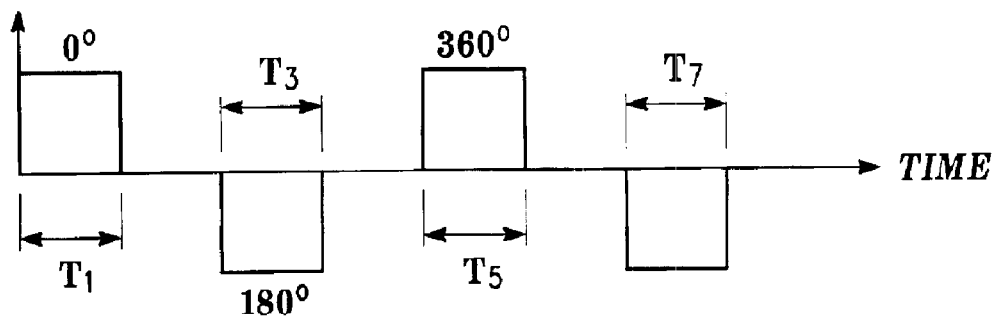
FIGS. 4 and 5 illustrate the timing and polarity of driving currents for coils A and B of the stepping motor.

FIGS. 1, 2, and 3 are exposed plan views illustrating three sequential stages of operation of a two-phase stepping motor. As can be seen, the stepping motor comprises a housing 10, first and second coils A and B disposed substantially perpendicularly to each other, and a rotor 12 which rotates about an axis 14 and which is surrounded by a magnetic ring 16 containing a plurality of pole-pairs. That is, magnetic ring 16 comprises a plurality of alternately spaced north poles 18 and south poles 20. Stepping motors of this type are well-known and may be of the type designed by Moving Magnet Technologies (MMT) located in France and manufactured in Japan by Yazaki.

Figure 5:
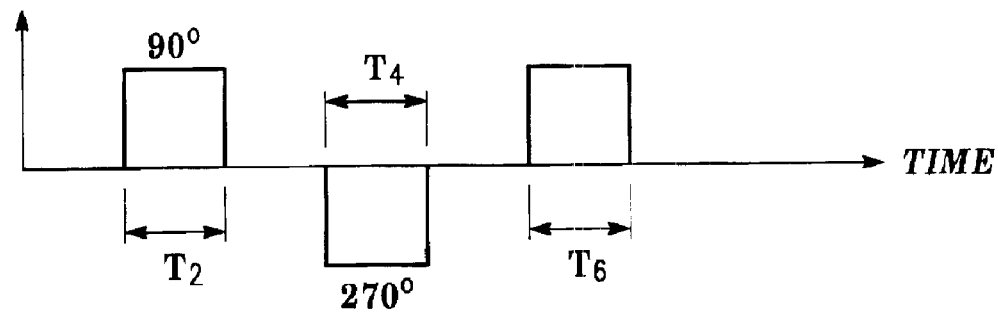

Referring to FIG. 1, coil A is driven with a positive current such as is shown at time $T_1$ (0 degrees) in FIG. 4. This creates a north pole in coil A in region 25 adjacent magnetic ring 16. Thus, a south pole 22 comes to rest adjacent coil A. It is to be noted that a second south pole 24 is positioned slightly in front of coil B. At time $T_2$ (90 degrees) shown in FIG. 5, positive current is supplied to coil B, and the drive current previously applied to coil A is terminated (i.e. transitions to zero). This creates a positive pole at extremity 26 of coil B causing magnetic ring 16 and therefore rotor 12 to rotate by eighteen degrees such that south pole 24 comes to rest adjacent coil B as is shown in FIG. 2. Next, (at time T3—180 degrees) coil A is supplied with a negative current shown in FIG. 4, which creates a south pole at extremity 25 at coil A while coil B is undriven. In this case, north pole 28 on magnetic ring 16 is attracted by the south pole created at extremity 25 causing it to step forward to a position adjacent extremity 25 as is shown in FIG. 3 thus stepping rotor 12 forward another eighteen degrees. It is well known that by choosing the appropriate drive currents, half-stepping or even micro-stepping can be achieved. Thus, by continuing to provide drive currents to coil A and coil B as shown in FIGS. 4 and 5 respectively, rotor 12 is caused to rotate. Since the production of control voltages and currents for stepping motors is well known, further discussion at this time is not deemed necessary.

As each coil is deenergized (e.g. coil A transitioning from time $T_1$ to time $T_2$ and from time $T_3$ to time $T_4$ as shown in FIG. 4 and coil B transitioning from time $T_2$ to time $T_3$ and from time $T_4$ to time $T_5$ as shown in FIG. 5), a back electro-motor-force (emf) is produced in the respective coils. By monitoring the back emf voltages, a stall condition of the stepping motor can be detected since if the motor is stalled, there will be no rotation transition and therefore no back emf signal. Such a condition is shown at time $T_8$ shown in FIG. 8.

Figure 6:
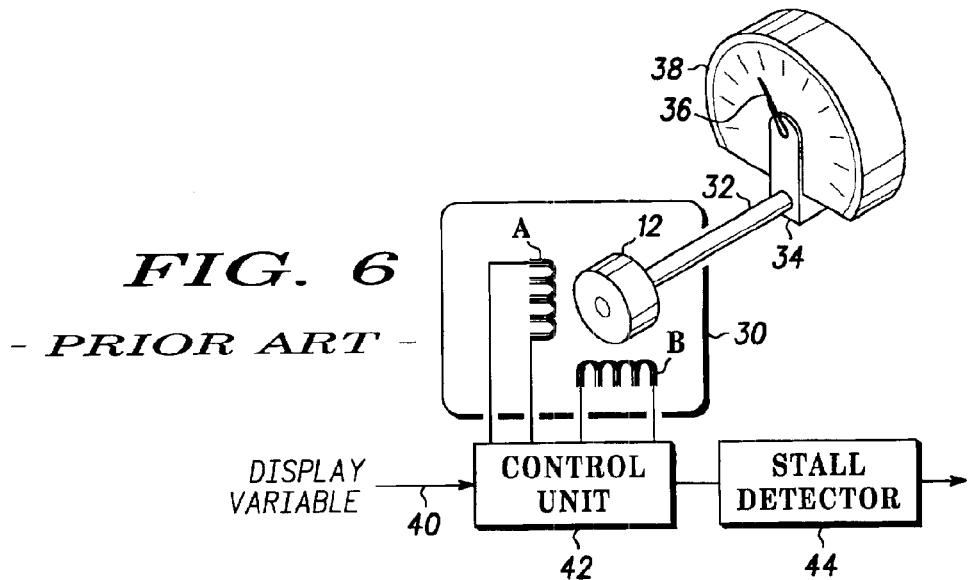

As stated previously, it is known to monitor the voltage created by the back emf and compare it to a threshold voltage, the purpose being that if the voltage exceeds the threshold voltage, the motor's rotor is still rotating, and if the voltage does not exceed the threshold voltage, the rotor has stopped and is in a stall condition. Such a system is shown in FIG. 6 which illustrates a stepping motor 30 includes coils A and B which are driven as previously described to cause rotor 12 to turn. Rotor 12 is coupled by means of a shaft 32 and transmission 34 to an actuator load in the form of a needle or pointer 36 on a display or gauge 38. A signal representative of a variable such as vehicle speed or motor rpm to be displayed at gauge 38 is applied to an input 40 of control unit 42. Control unit 42 contains the appropriate combinatorial logic to convert the magnitude of the signal appearing at input 40 to a number of steps that stepping motor 30 must be rotated in order that needle 36 accurately reflect a measurement of the display variable. Control unit 42 also monitors the back emf signals produced in coils A and B and provides these signals to a stall detector 44 which in the past has involved merely comparing the back emf voltage to a threshold voltage to detect a stall condition. Unfortunately, as stated above, in a low-speed mode, the back emf is not unidirectional but oscillates and its characteristics vary with the inertia of the rotor and the size of the load (in this case the mass of needle 36) being driven by the rotor. The back emf voltage is proportional to the rate of change of the magnetic flux with respect to time; i.e. $V_{emf}=d\Phi/dt$. This voltage is load dependent as described above. However, the integral of the change in magnetic flux represents the total change in magnetic flux and is not impacted by the flux changing slowly or quickly (i.e. load dependent effects) or by drive current variations.

Figure 7:
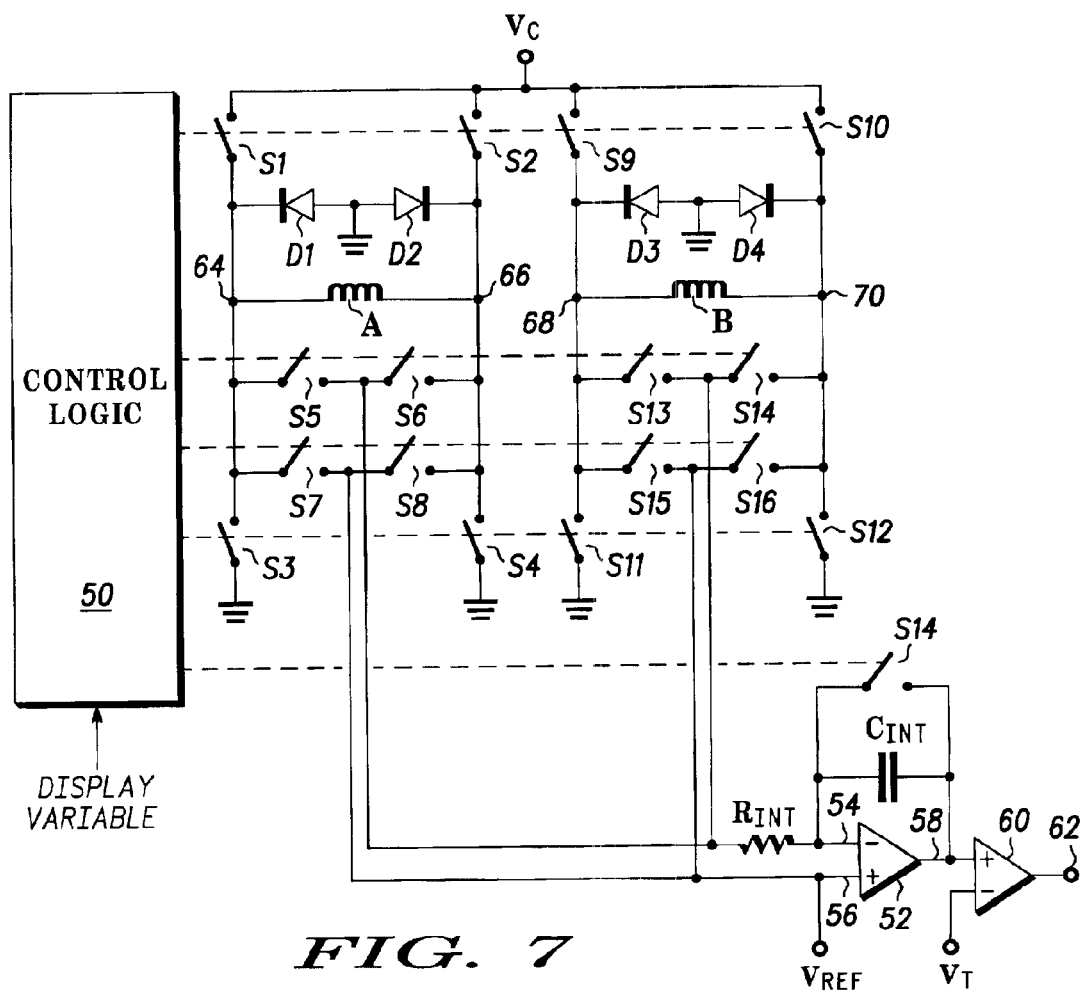
FIG. 7 is a schematic diagram partially in block form of a stall condition detection circuit in accordance with the present invention.

This characteristic is taken advantage of by the inventive stepping motor stall detection circuitry shown in FIG. 7 which is a functional schematic diagram, partially in block diagram form. Coils A and B, previously referred to, are each associated with coil drive-current control and generation circuitry which, under the control of logic circuit 50, determines when, in what direction, and to what extent each coil is driven. Each coil is also provided with multiplexer circuitry for providing corrected polarity back-emf voltage signals to integrator 52. For example, the application and direction of current flowing through coil A is determined by switches $S_1$–$S_4$. Similarly, switches $S_9$–$S_{12}$ control the application and direction of current applied to coil B. As can be seen, switches $S_1$–$S_4$ and $S_9$–$S_{12}$ are in turn controlled by control logic 50.

The back emf voltage signals which result from rotor movement will have a first polarity if the current of coil A is flowing from right to left and a second polarity if flowing from left to right. To assure that all emf voltage signals are provided to integrator 52 with the same polarity, coil A is provided with multiplexer circuitry comprising switches $S_5$–$S_8$. Similarly, coil B is provided with multiplexer circuitry comprising switches $S_{13}$–$S_{16}$. As was the case previously, switches $S_5$–$S_8$ and $S_{13}$–$S_{16}$ are coupled to and controlled by control logic 50.

As can be seen, switch $S_1$ is coupled between a source of supply voltage $V_C$ and a first terminal of coil A, switch $S_2$ is coupled between $V_C$ and a second terminal of coil A, switch $S_3$ is coupled between the first terminal of coil A and ground, and switch $S_4$ is coupled between the second terminal of coil A and ground. Switches $S_9$–$S_{12}$ are similarly configured with respect to coil B. Coupled across the terminals of coil A is (1) a first pair of series coupled switches $S_5$ and $S_6$ and (2) a second pair of series coupled switches $S_7$ and $S_8$. Likewise, coupled across the terminals of coil B is (1) a first pair of series coupled switches $S_{13}$ and $S_{14}$ and (2) a second pair of series coupled switches $S_{15}$ and $S_{16}$. The junction of switches $S_5$ and $S_6$ and the junction of switches of $S_{13}$ and $S_{14}$ are coupled to a first input 54 of integrator 52 which has an internal resistance $R_{int}$ associated therewith. The junction of switches $S_7$ and $S_8$ and the junction of switches of $S_{15}$ and $S_{16}$ are coupled to a second input 56 of integrator 52 which is also coupled to a reference voltage $V_{ref}$. An internal capacitor $C_{int}$ is coupled across input 54 and output 58 of integrator 52 as are the terminals of switch $S_{14}$, the purpose of which will be described herein below. As can be seen, switch $S_{14}$ is likewise under the control of control logic 50. The output of integrator 52 is coupled to a first input of comparator 60. The second input of comparator 60 is coupled to receive a threshold voltage $V_T$. The output of comparator 60 is coupled to terminal 62 which indicates whether or not a stall condition has been detected.

The operation of the stall detection circuit shown in FIG. 7 will now be described in conjunction with FIGS. 4, 5, and 6. At zero degrees (time $T_1$), coil A has a positive drive current applied to it by closing switches $S_1$ and $S_4$. At 90 degrees (time $T_2$), low drive current is applied to coil A; however, a positive drive current is applied to coil B by closing switches $S_9$ and $S_{12}$. The drive current through coil B causes the rotor of the stepping motor to rotate creating a back emf in coil A. By closing switch $S_5$ and $S_8$, this emf is applied to integrator 52 by coupling terminal 64 of coil A through switch $S_5$ to input 54 of integrator 52 and by coupling terminal 66 of coil A through switch $S_8$ to input 56 of integrator 52. At 180 degrees (time $T_3$), the drive signal through coil B is terminated; however, a negative drive current is applied to coil A by closing switches $S_2$ and $S_3$ causing the stepping motor's rotor to continue moving past coil B which in turn produces a back emf in coil B. This back emf is coupled to integrator 52 by coupling terminal 68 of coil B through switch $S_{13}$ to input 54 of integrator 52 and by coupling terminal 70 of coil B to terminal 56 of integrator 52 via switch $S_{16}$.

At 270 degrees (time $T_4$), the drive current to coil A is terminated and a negative drive current is applied to coil B by closing switches $S_{10}$ and $S_{11}$. Since coil A has transitioned from a driven to an undriven state, a back emf voltage is produced, only this time of opposite polarity to that which was created at 90 degrees. However by closing switches $S_6$ and $S_7$, terminal 66 of coil A is coupled to input 54 of integrator 52, and terminal 64 of coil A is coupled to input 56 of integrator 52 via switch $S_7$. In this manner, the pulse has been rectified (i.e. its polarity corrected) to provide a back emf signal to integrator 52 of the same polarity. In a similar fashion, at 360 degrees, coil B transitions from a negatively driven state to an undriven state generating a back emf voltage of opposite polarity to that which was generated at 180 degrees (time $T_3$). Again, however, this polarity is reversed by closing switches $S_{14}$ and $S_{15}$ to couple terminal 68 of coil B to input 56 of integrator 52 and terminal 70 of coil B to input 54 of integrator 52. Thus, a series of integrated signals shown in FIG. 8 will appear at the output of integrator 58.

Figure 8:
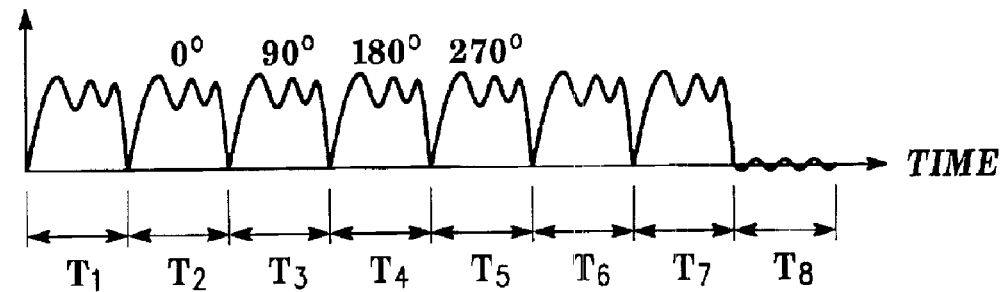
FIG. 8 illustrates a series of signals appearing at the output of the integrator shown FIG. 7 for comparison with a threshold to determine a stall condition.

Since, the back emf voltages are the result of the rotor continuing its motion past coils A and B, no back emf will be generated if the rotor has stalled. This condition is shown at time $T_8$ in FIG. 8. The signals shown in FIG. 8 are applied to a first input of comparator 60, and a threshold voltage $V_T$ is applied to a second input. At time $T_8$, the output of integrator 52 will not exceed threshold $V_T$ and a stall will be detected.

In addition to the change in flux in coils A and B which results from rotor motion, it should be understood that drive current decay causes an additional change in flux in the coils. In order to prevent the stall detection process from being influenced by the decay of the drive currents in the coils, the inventive stall detection circuit provides for (1) the generation of a sufficient voltage across the coils to cause rapid current decay and (2) a short masking or blanking period between the deenergizing of a coil and the integration of the emf voltage during which the back emf voltage is ignored. This masking or blanking period is provided by switch $S_{14}$ which, under the control of control logic 50, maintains integrator 52 in a reset condition. The blanking period can be a predetermined length or the length could be programmable. Furthermore, the inventive stall detection circuit could include circuitry which determines when the current in the coil has sufficiently decayed prior to commencing integration.

Diodes $D_1$ and $D_2$ assist in the rapid decay of drive current in coil A, and diodes $D_3$ and $D_4$ assist in the rapid decay of drive current in coil B. They accomplish this by providing a sufficient voltage across coils A and B respectively. As can be seen, diodes $D_1$ and $D_2$ have their anodes coupled together and to ground while their cathodes are coupled to terminals 64 and 66 respectively of coil A. Diodes $D_3$ and $D_4$ are similarly configured with respect to coil B.

Thus, there has been provided a method and apparatus for detecting a stall condition in a stepping motor which independent of variations in the coil drive currents and load characteristics of the motor. The back emf voltages in the coils due to rotor motion are first rectified to provide a series of pulses of the same polarity and then integrated. The output of the integrator is then compared to a threshold voltage to determine if a stall condition exists.

While preferred exemplary embodiments have been presented in the foregoing detailed description, it should be appreciated that a vast number of variations in the embodiments exist. The above description is given by way of example only. Changes in form and details may be made by one skilled in the art without departing from the spirit and scope of the invention as defined in the appended claims.

What is claimed is:

1. An apparatus for detecting a stall condition of a stepping motor of the type which includes at least first and second coils and a rotor having a plurality of magnetic poles therearound, said apparatus comprising:

a control circuit;

a current generator comprising a first switching circuit coupled to the control circuit and controlled thereby, the current generator for alternately supplying drive currents to said first and second coils causing the rotor to step, each of said first and second coils generating signals of alternating polarity when transitioning from a driven state to a non-driven state, said signals resulting from motion of said rotor;

a rectifying circuit coupled to the control circuit, the rectifying circuit for correcting the polarity of said signals;

a blanking circuit for masking an initial portion of each of said signals;

an integrator having an input coupled to receive said polarity corrected signals from the rectifying circuit and for generating an integrated version thereof; and a comparator coupled to said integrator for comparing said integrated version with a predetermined threshold to detect the stall condition.

2. An apparatus according to claim 1 wherein said rectifying circuit comprises a second switching circuit coupled to said control circuit and controlled thereby.

3. An apparatus according to claim 2 wherein said blanking circuit comprises a third switching circuit coupled to said control circuit and controlled thereby.

4. An apparatus for detecting a stall condition of a stepping motor of the type which includes at least first and second coils and a rotor having a plurality of magnetic poles therearound, said apparatus comprising:

control means;

current generating means comprising switching means coupled to the control means and controlled thereby, the current generating means for alternately driving said first and second coils causing said rotor to perform a stepping rotation, each of said first and second coils generating a back emf voltage signal of alternating polarity when transitioning from a driven to a non-driven state due to the rotation of said rotor;

rectifying means coupled to the control means, the rectifying means for correcting the polarity of the back emf voltage signals;

blanking means for masking a predetermined initial portion of each of the rectified back emf voltage signals;

integrating means coupled to receive said polarity corrected back emf voltage signals to generate an integrated version thereof; and comparison means coupled to said integrating means for comparing said integrated version with a predetermined threshold to detect the stall condition.

5. An apparatus for displaying a measure of a variable, comprising:

a stepping motor, comprising:
at least first and second coils; and
a rotor having a plurality of magnetic poles therearound;

a display actuator coupled to said rotor for movement by said rotor to reflect a measure of said variable;

a control circuit;

a current generator comprising a switching circuit coupled to the control circuit and controlled thereby, the current generator for alternately supplying drive currents to said first and second coils causing said rotor to rotate by an amount indicative of the measure of said variable, each of said first and second coils generating signals of alternating polarity when transitioning from a driven to a non-driven state, said signals resulting from the motion of said rotor;

a rectifying circuit coupled to the control circuit, the rectifying circuit for correcting the polarity of said signals;

a blanking circuit for masking an initial portion of each of said signals;

an integrator having an input coupled to receive said polarity corrected signals and for generating an integrated version thereof; and a comparator coupled to said integrator for comparing said integrated version with a predetermined threshold to detect a stall condition.

6. A method for detecting a stall condition of a stepping motor of the type which includes at least first and second coils and a rotor having a plurality of magnetic poles therearound, said apparatus comprising:

providing a current generator comprising a switching circuit coupled to a control circuit and controlled thereby, the current generator alternately driving said first and second coils to with drive signals to cause said rotor to rotate, each of said first and second coils generating emf signals of alternating polarity when transitioning from a driven to a non-driven state, said emf signals being caused by movement of said rotor;

rectifying said emf signals;

masking an initial portion of each of said rectified emf signals;

integrating the rectified emf signals; and comparing the integrated emf signals with a predetermined threshold to detect a stall condition.

* * * * *